(12) United States Patent
Kilibarda (10) Patent No.: US 9,796,041 B2
(45) Date of Patent: Oct. 24, 2017

(54) METHOD FOR COMPONENT HANDLING AND CONNECTING OF COMPONENTS

(71) Applicant: Comau LLC, Southfield, MI (US)

(72) Inventor: Velibor Kilibarda, Southfield, MI (US)

(73) Assignee: Comau LLC, Southfield, MI (US)

( * ) Notice: Subject to any disclaimer, the term of this patent is extended or adjusted under 35 U.S.C. 154(b) by 214 days.

(21) Appl. No.: 14/576,377

(22) Filed: Dec. 19, 2014

(65) Prior Publication Data

US 2015/0165543 A1  Jun. 18, 2015

Related U.S. Application Data

(62) Division of application No. 13/621,509, filed on Sep. 17, 2012, now Pat. No. 8,950,065.

(60) Provisional application No. 61/536,090, filed on Sep. 19, 2011.

(51) Int. Cl.
  *H05K 3/30* (2006.01)
  *B23K 11/31* (2006.01)
  *B23K 11/11* (2006.01)

(52) U.S. Cl.
  CPC .......... *B23K 11/314* (2013.01); *B23K 11/115* (2013.01); *B23K 11/315* (2013.01); *Y10S 483/901* (2013.01); *Y10S 901/27* (2013.01); *Y10S 901/28* (2013.01); *Y10S 901/29* (2013.01); *Y10S 901/30* (2013.01); *Y10S 901/50* (2013.01); *Y10T 29/4913* (2015.01); *Y10T 29/49075* (2015.01); *Y10T 29/4984* (2015.01); *Y10T 29/49815* (2015.01); *Y10T 29/49826* (2015.01); *Y10T 29/5313* (2015.01); *Y10T 29/53174* (2015.01); *Y10T 74/20305* (2015.01); *Y10T 74/20311* (2015.01); *Y10T 74/20329* (2015.01); *Y10T 74/20335* (2015.01); *Y10T 403/7005* (2015.01); *Y10T 403/7007* (2015.01);
(Continued)

(58) Field of Classification Search
  CPC ... B23K 11/115; B23K 11/314; B23K 11/315; Y10T 29/49075; Y10T 29/4913; Y10T 29/49815; Y10T 29/49826; Y10T 29/4984; Y10T 29/5313; Y10T 29/53174
  See application file for complete search history.

(56) References Cited

U.S. PATENT DOCUMENTS 4,393,293 A     7/1983  Inoue et al.
4,551,605 A  *  11/1985 Numata ............. B23K 11/3018
                                                            219/86.31
(Continued)

FOREIGN PATENT DOCUMENTS

WO        2010/111159 A2    9/2010

*Primary Examiner* — Paul D Kim
(74) *Attorney, Agent, or Firm* — Young Basile Hanlon & MacFarlane, P.C.

(57) ABSTRACT

A combination component handling and connecting device connectable to a multi-axis robot for use in moving and connecting components and subassemblies includes a housing and an actuator fixedly connected to the housing. The actuator includes an actuating link movable from a first position to a second position. Connected to the actuating link is an end effector for concurrent movement with the actuating link. The component handling and connecting device includes a clamp having a first jaw and a second jaw. The second jaw is connected to the actuating link for selectively moving the second jaw toward the first jaw operative to engage a component.

8 Claims, 13 Drawing Sheets

(52) U.S. Cl.
CPC .... *Y10T 403/7039* (2015.01); *Y10T 403/7073* (2015.01); *Y10T 483/17* (2015.01)

(56) References Cited

U.S. PATENT DOCUMENTS

| | | | | |
|---|---|---|---|---|
| 5,239,155 | A * | 8/1993 | Olsson | B23K 11/115 |
| | | | | 219/86.21 |
| 5,252,801 | A | 10/1993 | Angel et al. | |
| 5,731,563 | A * | 3/1998 | Baustert | B23K 11/318 |
| | | | | 219/89 |
| 6,596,958 | B1 * | 7/2003 | Chase | B23K 11/314 |
| | | | | 219/86.25 |
| 6,723,944 | B1 | 4/2004 | Angel | |
| 6,911,616 | B2 * | 6/2005 | Kilabarda | B23K 11/3018 |
| | | | | 219/120 |
| 7,067,760 | B2 * | 6/2006 | Porta | B23K 11/317 |
| | | | | 219/86.25 |
| 8,651,046 | B1 | 2/2014 | Davancens et al. | |
| 8,950,065 | B2 | 2/2015 | Kilibarda | |
| 2004/0045939 | A1 | 3/2004 | Angel | |
| 2010/0180711 | A1 | 7/2010 | Kilibarda et al. | |

\* cited by examiner

METHOD FOR COMPONENT HANDLING AND CONNECTING OF COMPONENTS

CROSS-REFERENCE TO RELATED-APPLICATION

This divisional application claims priority benefit to U.S. patent application Ser. No. 13/621,509, filed Sep. 17, 2012, now U.S. Pat. No. 8,950,065, which is a non-provisional application of U.S. Provisional Patent Application Ser. No. 61/536,090, filed Sep. 19, 2011, both of which are incorporated herein by reference in their entirety.

TECHNICAL FIELD

The present invention generally relates to the field of manufacturing.

BACKGROUND

In the manufacture and assembly of transportation vehicles, and more specifically in an application where sheet metal vehicle skeletal frames called body-in-white (BIW), dozens and dozens of individual sheet metal components and subassemblies are welded or otherwise connected together in sequential build stations positioned along an assembly line.

In modern, high-volume facilities, hundreds of industrial, multi-axis robots are used to move components and subassemblies from position to position, for example, from a part bin or rack positioned adjacent a build station to a holding fixture in the build station where it is connected to other components positioned in the same or different fixtures. Numerous additional industrial robots each have a resistance spot welding gun or rivet gun connected to a robot wrist that can be manipulated and positioned to spot weld, rivet, join, and otherwise connect the fixtured components at a particular build station.

In a typical prior build process, separate first robots were used to grasp components and subassemblies and deposit those components in a fixture or other structure in a build station for further processing. Separate second robots with weld guns or other end effectors, for example, adhesive applicators or other tooling, were used to spot weld or otherwise connect the components together before the connected subassembly can be transferred to the next build station for further processing in a similar manner described above.

Alternately, prior build processes have reduced the number of robots required by using end effectors on the robots that included both a weld gun having an actuator and a clamp or a material handling gripper that included a separate actuator. This was advantageous as it reduced the number of robots, but disadvantageous as more equipment was required to be carried and maneuvered by the robot requiring higher capacity robots to handle the load.

It would be advantageous to have a device and system that provided the benefits of reducing the number of robots through integration of a weld gun and a material handling gripper on a single robot while further reducing the amount of equipment required to operate the separate equipment and maintain the desired independent functions.

BRIEF SUMMARY

The inventive design includes a device and method whereby a single actuator, such as a cylinder, serves to operate or articulate an end effector, for example a weld gun armature, and a material handling clamp or gripper connected to the wrist of an industrial robot. In one example, a single robot thereby includes the capability of a fully functional weld gun and a material handling clamp, using a single actuator, to maneuver and connect parts and subassemblies in a build station or along an assembly line. The actuator includes an actuating link movable from a first position to a second position. The end effector may be connected to the actuating link for concurrent movement with the actuating link. The clamp includes a first jaw and a second jaw. The second jaw is connected to the actuating link for selectively moving the second jaw toward the first jaw operative to engage the parts and subassemblies.

BRIEF DESCRIPTION OF THE DRAWINGS

The description herein makes reference to the accompanying drawings, wherein like reference numerals refer to like parts throughout the several views, and wherein.

DETAILED DESCRIPTION OF EMBODIMENTS OF THE INVENTION

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

Referring to FIGS. 1-4, an example of a weld gun part clamp device 10 for use on one example of a resistance spot welding gun 12 connected to a multi-axis industrial robot for use in grasping or clamping an exemplary part or subassembly 14 is illustrated. In the example, and for purposes of simplicity, exemplary weld gun 12 includes a pair of spaced apart side plates 16 at least partially defining a housing. Side plates 16 are connected together by cross braces 18. Weld gun 12 further includes a transformer 20, an actuator 22 having a pneumatic, electric or hydraulic actuated actuating link or piston rod 24 connected to a first moveable weld arm 26 having a first weld tip 28 at its distal end. Actuator 22 is fixedly positioned relative to side plates 16, and is operable for moving piston rod 24 axially along a longitudinal axis of piston rod 24. First weld arm 26 is fixedly attached to piston rod 24 for concurrent movement therewith. In the exemplary welding gun 12, a second weld arm 30 is fixedly attached to side plates 16 and includes a second weld tip 32 oriented to oppose first arm weld tip 28. In the example shown, first weld arm 26 and second weld arm 30 are configured to form a throat 34 defined by the weld arms and weld tips. Piston rod 24 and first weld arm 26 are selectively movable relative to second welding arm 30 and weld tip 32.

Figure 1:
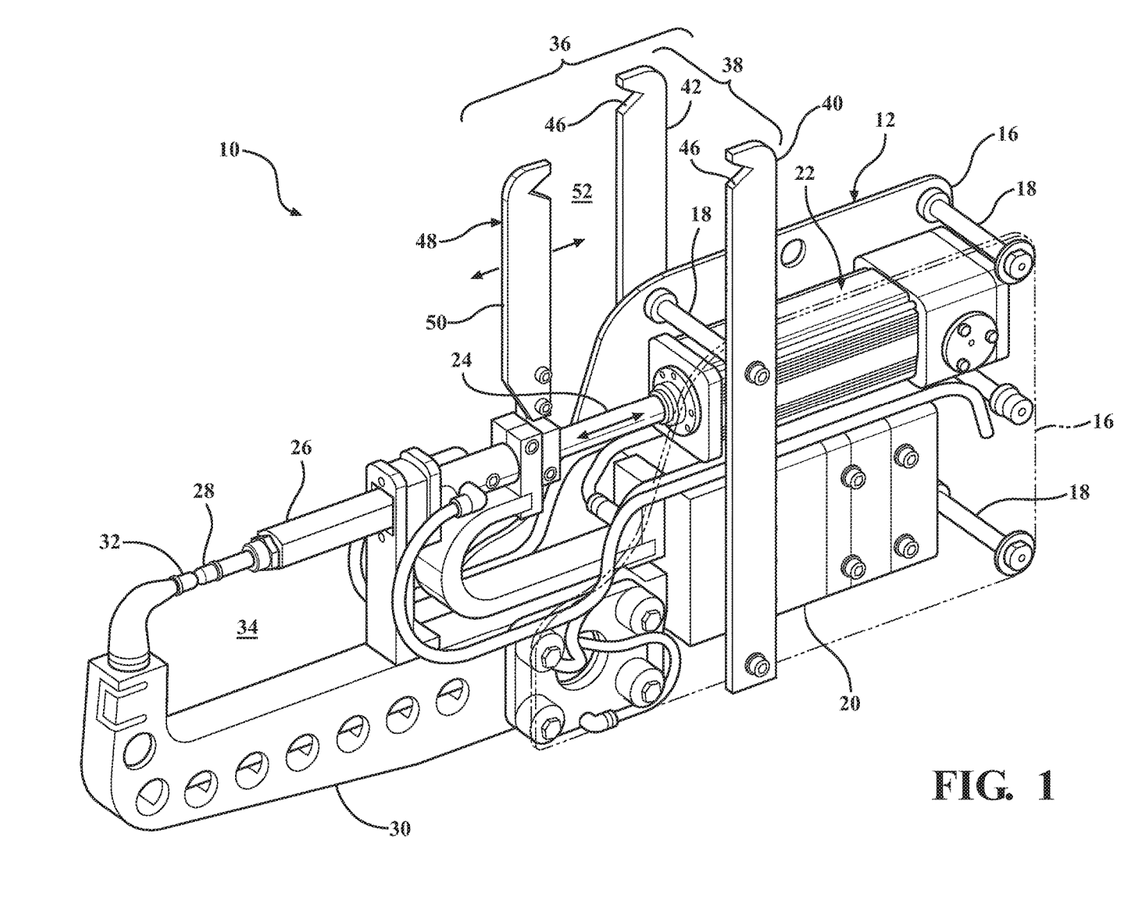
FIG. 1 is a schematic perspective view of an exemplary weld gun part clamp device employed with an exemplary weld gun, the part clamp positioned with a part gripping jaws in an open position without a part.
Figure 3:
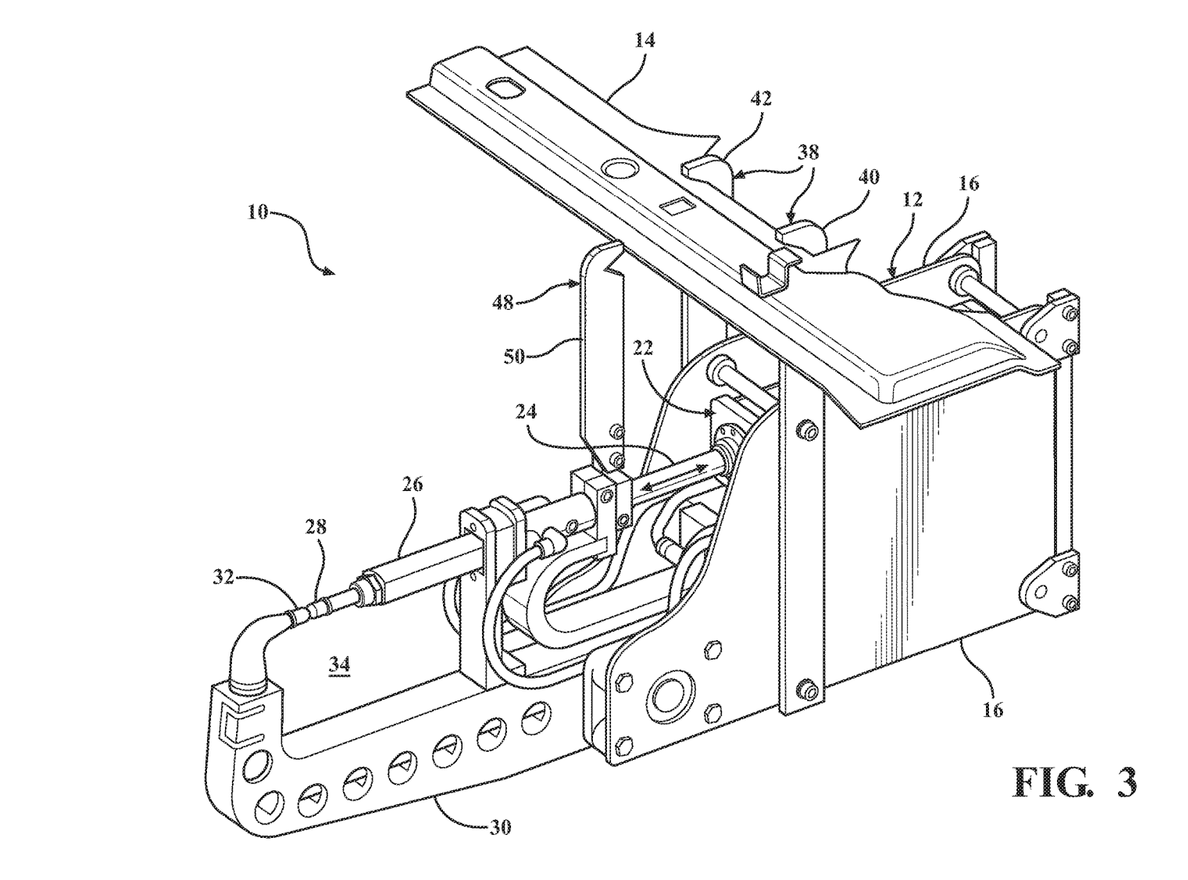
FIG. 3 is a schematic perspective view of the exemplary weld gun part clamp device of FIG. 1 illustrating a part positioned in the part clamp with the clamp jaws arranged in the open position.

In a typical operation for exemplary weld gun 12, actuator piston rod 24 is selectively moveable between a closed position, for example, as illustrated in FIGS. 1 and 3, whereby piston rod 24 is extended toward second weld tip 32 placing first weld tip 28 into contact with second weld tip 32 (or close proximity thereto to accommodate for a thicknesses of sheet metal components positioned between the welding tips to be spot welded).

Figure 2:
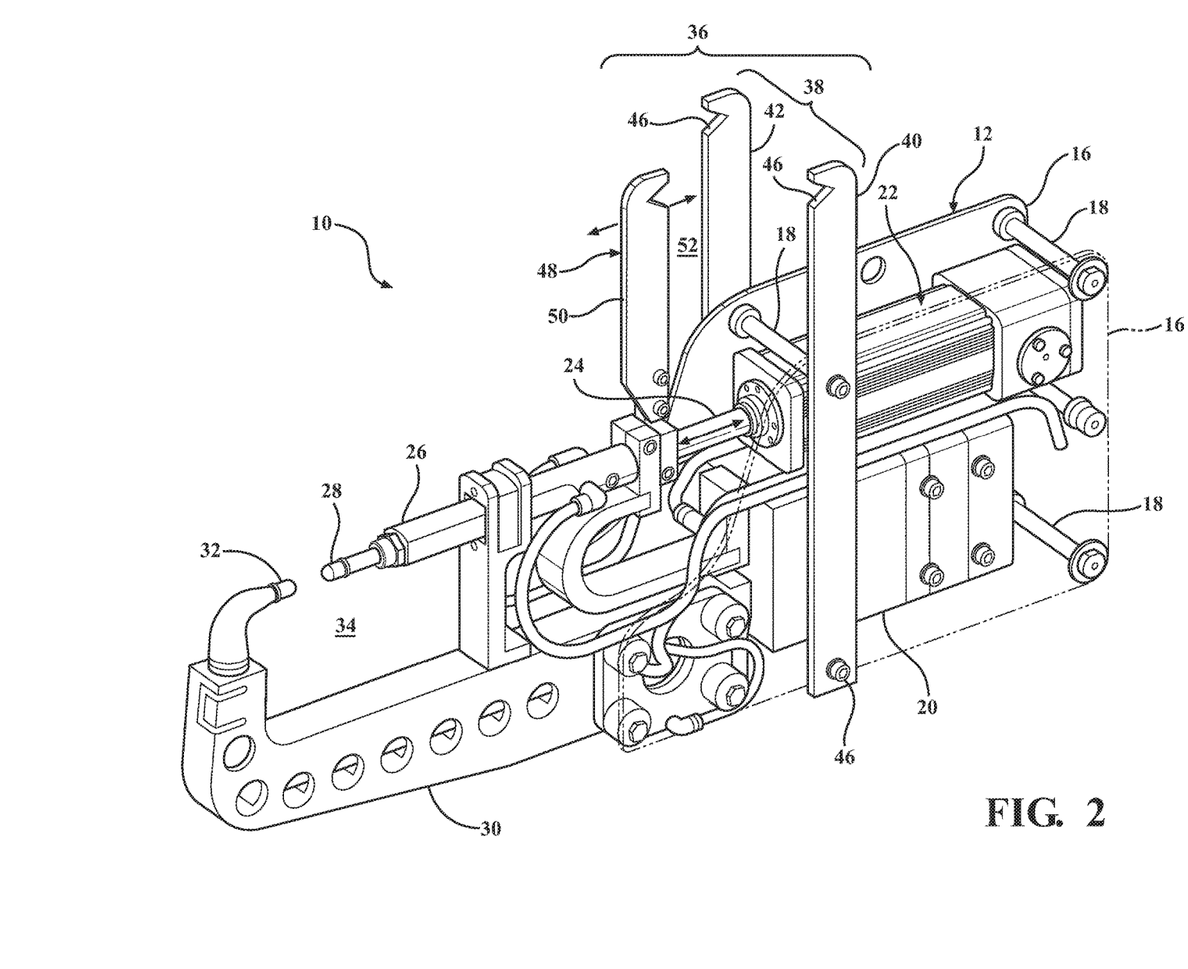
FIG. 2 is a schematic perspective view of the exemplary weld gun part clamp device of FIG. 1 with the part gripping jaws positioned in a closed position without a part.
Figure 4:
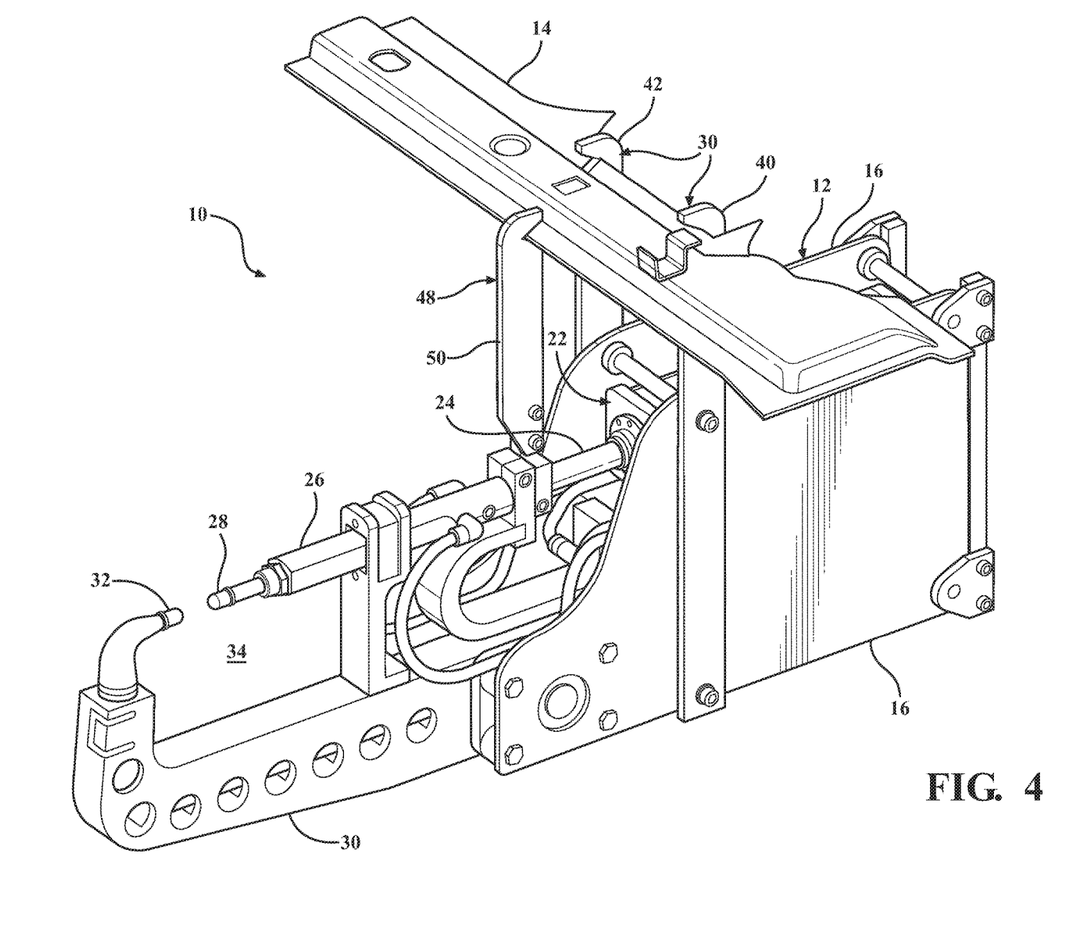
FIG. 4 is a schematic perspective view of the exemplary weld gun part clamp device of FIG. 1 illustrating the part positioned in the part clamp with the clamp jaws arranged in the closed position to secure the part to an end effector weld gun.

In a typical open position, for example, as illustrated in FIGS. 2 and 4, piston rod 24 is cycled to retract first weld tip 28 toward actuator 22. In the illustrated example, actuator 22 would typically be electronically connected to a programmable controller and processor having preprogrammed sequences and operations to engage and move actuator 22 and the connected robot to suit the particular application. Further details and variations of weld gun 12 may be found in U.S. patent application Ser. Nos. 12/207,534 and 12/689,993 assigned to the present assignee of the invention, both applications incorporated herein by reference. It shall be understood that other weld gun configurations, such as those shown for example in FIGS. 9-12, robot end effectors and similar manufacturing equipment may be used in connection with the disclosed exemplary weld gun part clamp device.

With continued reference to FIG. 1, a first example of weld gun part clamp 36 is illustrated. In the example, clamp 36 includes a first jaw 38 having a first jaw member 40 and a second jaw member 42 each connected to respective side plates 16 across a width of weld gun 12 as generally illustrated. In the example, first jaw member 40 and second jaw member 42 are elongate members rigidly connected to side plates 16 through common fasteners 44 or another connection mechanism, for example, welding and brazing. Jaw members 40 and 42 each include a seat 46 illustrated in the form of a triangular notch to engage a portion of a part 14. In one example, jaw members 44 and 46 are made from heavy gauge steel. Other materials may also be employed. Although two separate jaws members are illustrated, it shall be understood the jaw member may be made from a single piece and there may be fewer or more jaw members to constitute first jaw 38.

In the example clamp 36, a second jaw 48 positioned opposite first jaw 38 is illustrated. In the example, second jaw 48 includes a third jaw member 50 similar in configuration, positioned in opposing orientation and made from similar materials as first and second jaw members 40 and 42. In the example shown, first jaw 38 and second jaw 48 form a throat 52 between the jaws. Third jaw member 50 is connected to actuator piston rod 24 and reciprocates along with piston rod 24 and first weld tip 28 to close a linear distance between first jaw 38 and second jaw 48 across throat 52.

When operating weld gun part clamp device 10 in an exemplary application, such as a build station where part 14 (see FIGS. 3 and 4) is positioned in a storage rack adjacent an assembly line for delivery to a welding fixture for processing, for example spot welding the part or component 14 to a second component, a robot operably connected to weld gun part clamp device 10 may be employed to position weld gun 12 and clamp 36 in any three-dimensional coordinate position adjacent part 14. Actuator 22 may be cycled to close first weld arm 26, thereby moving second jaw 48 to an open position, as illustrated for example in FIGS. 1 and 3, and weld tips 28 and 32 are arranged in a closed position. The robot may be operated to position clamp 36 relative to part 14 so that part 14 is positioned within throat 52. With part 14 positioned in throat 52, actuator 22 may be cycled to move second jaw member 42 to a closed position, wherein part 14 is engaged and securely held by first jaw 38 and second jaw 48 to enable the part to be moved to a desired position within the welding fixture. To disengage clamp 36 from part 14 the process is cycled in reverse to open clamp 36.

In one exemplary operation, after part 14 is positioned within a welding fixture, having been deposited by the robot utilizing weld gun part clamp device 10, weld gun 12 and clamp 36, in abutting contact with a second component for spot welding, the weld gun 12 can immediately switch operative functions and the same actuator 22 can be used to cycle weld arm 26 to spot weld part 14 through weld tips 28 and 32. Weld gun part clamp device 10 is highly advantageous in that device 10, while employing a single actuator 22 supported by a single robot can perform dual operations of material handling and spot welding (or other operation depending on the particular end effector connected to the robot). It is understood that other parts 14, build sequences and similar material handling operations other than that described above may be used or employed with the weld gun part claim 10.

Figure 5:
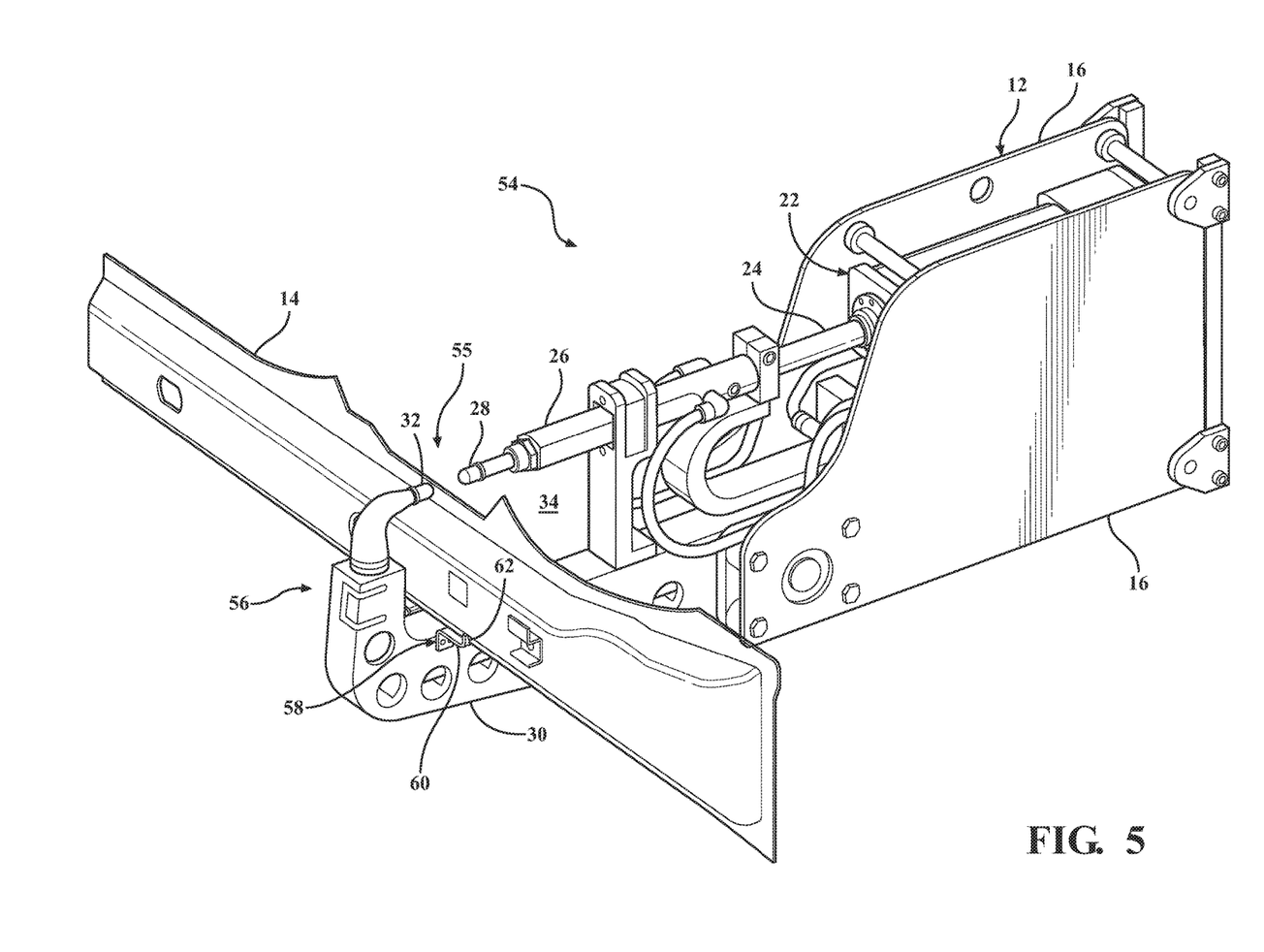
FIG. 5 is a schematic perspective view of the exemplary weld gun of FIG. 1, wherein a weld gun armature and weld tips serve as clamp jaws, the weld tip jaws arranged in an open position.
Figure 6:
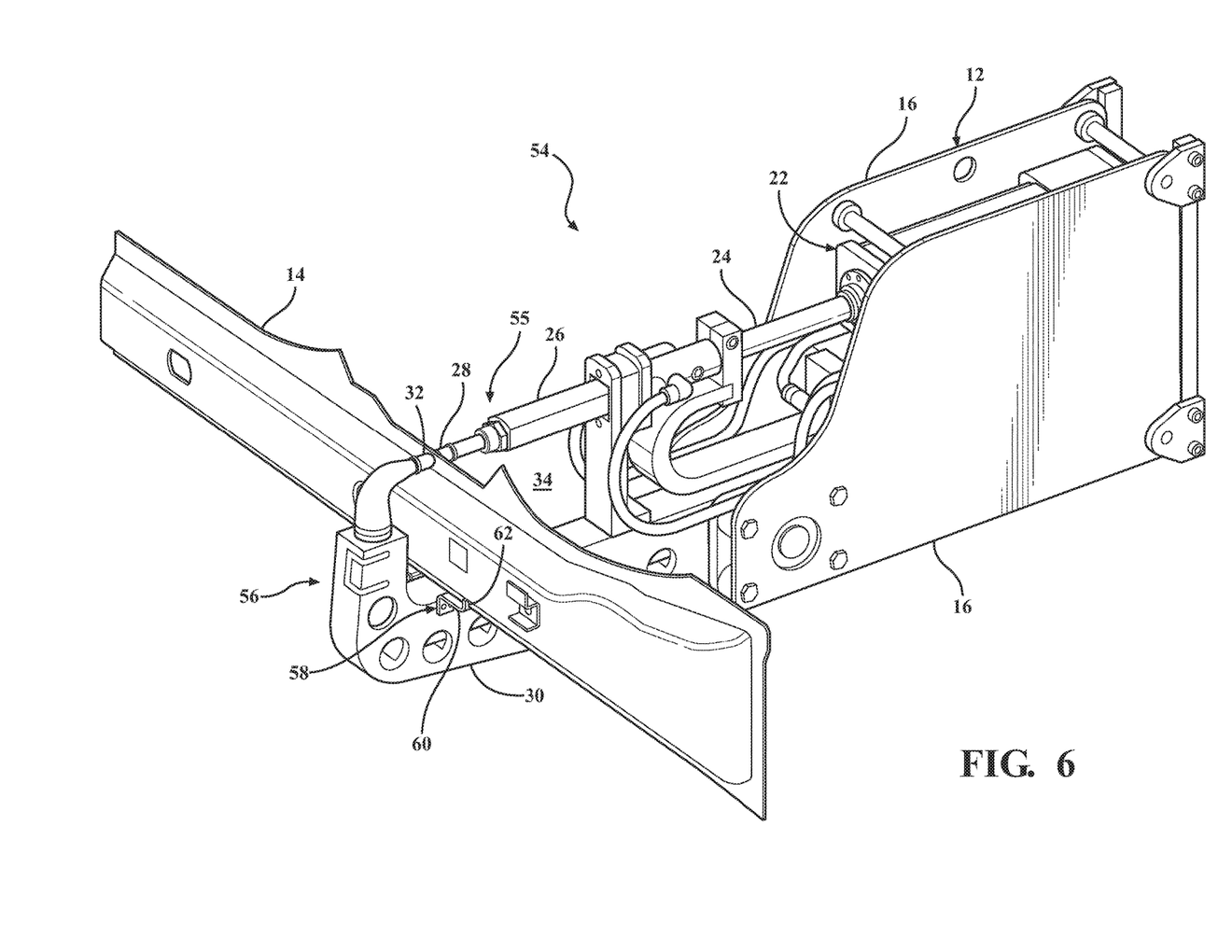
FIG. 6 is a schematic perspective view of the exemplary weld gun part clamp shown in FIG. 5 illustrating the weld tip jaws in a closed position to secure the part to an end effector weld gun.

Referring to FIGS. 5 and 6, an alternately configured weld gun part clamp device 54 is illustrated. Weld gun part clamp device 54 has a similar configuration as weld gun part clamp device 10, but employs an alternately configured weld gun part clamp 56 in place of weld gun part clamp 36 (see FIGS. 1 and 2). Weld gun part clamp device 54 retains the existing throat 34 defined by first weld arm 26 and second weld arm 30 of weld gun part clamp device 10 (see FIGS. 1 and 2), and weld tips 28 and 32 operate as a second jaw 55 to engage and secure part 14 to weld gun 12 for material handling operations. In the example, weld gun part clamp 56 includes a first jaw 58 in the form of a support member 60 rigidly connected to second weld arm 30, as generally illustrated. A second support member, which may be similarly or differently configured than support member 60, may be rigidly connected to second weld arm 30 on a side opposite support member 60. Support member 60 may include an appropriate seat or nest 62, for example a triangular notch similar to seat 46 in first and second jaw member 40 and 42 (see FIGS. 1 and 2), to cradle the particular part 14 to be held. Support member 60 may include different configuration and may be positioned at various locations and orientations along second weld arm 30 to suit a particular application.

As illustrated in the alternate example, second jaw 55 employs weld tips 28 and 32 as second jaw 55 to selectively engage part 14, thereby sandwiching part 14 in throat 34 and securing part 14 to weld gun 12 for material handling operations suitable for the particular application and build sequence, for example, as generally described above. Similarly, a single actuator 22 is used for both material handling and spot welding operations on part 14 using a single robot. It is understood that a different support member 60, and different positions and orientations of the members with respect to the weld arms, suitable for the particular application may be used. Further, although a spot welding gun 12 and weld tips 28 and 32 are shown, it is understood that other end effectors and tips suitable for the application and build process that engage part 14 and are connected to the robot may be used.

Figure 7:
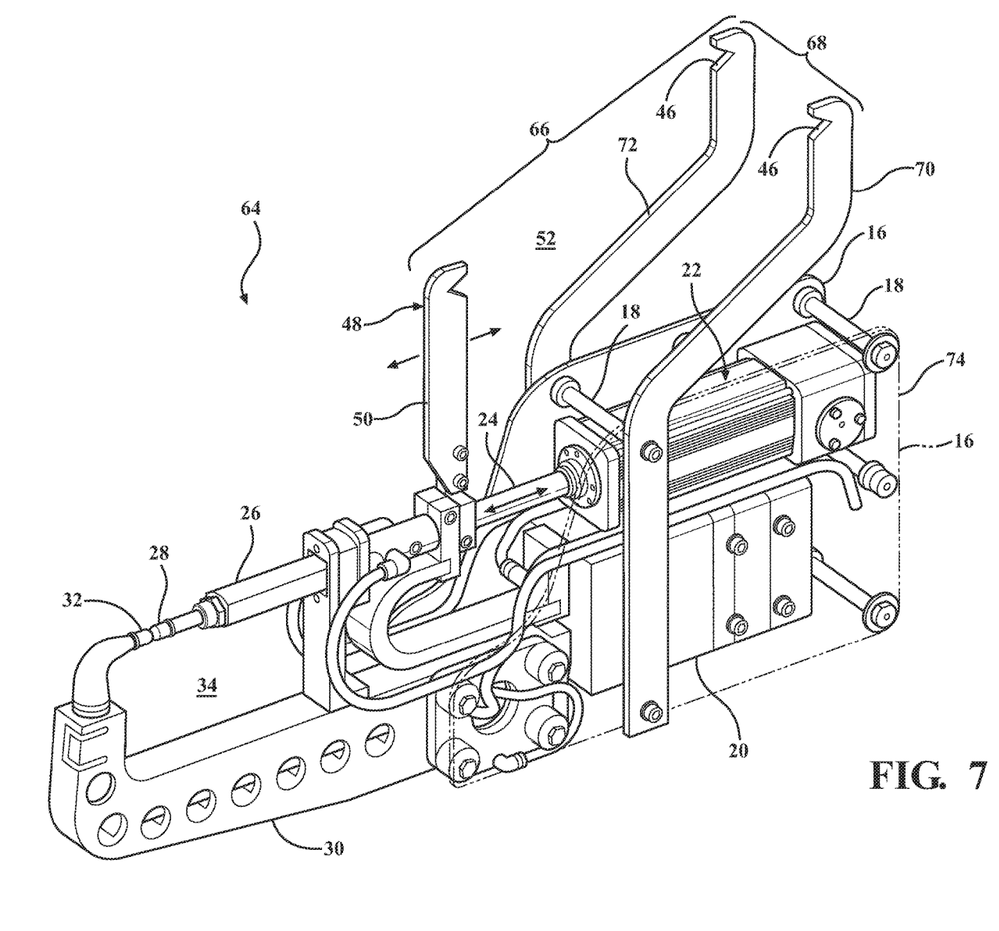
FIG. 7 is a schematic perspective view of the exemplary resistance spot welding gun part clamp of FIG. 1 employing alternately configured clamp jaws arranged in an open position.
Figure 8:
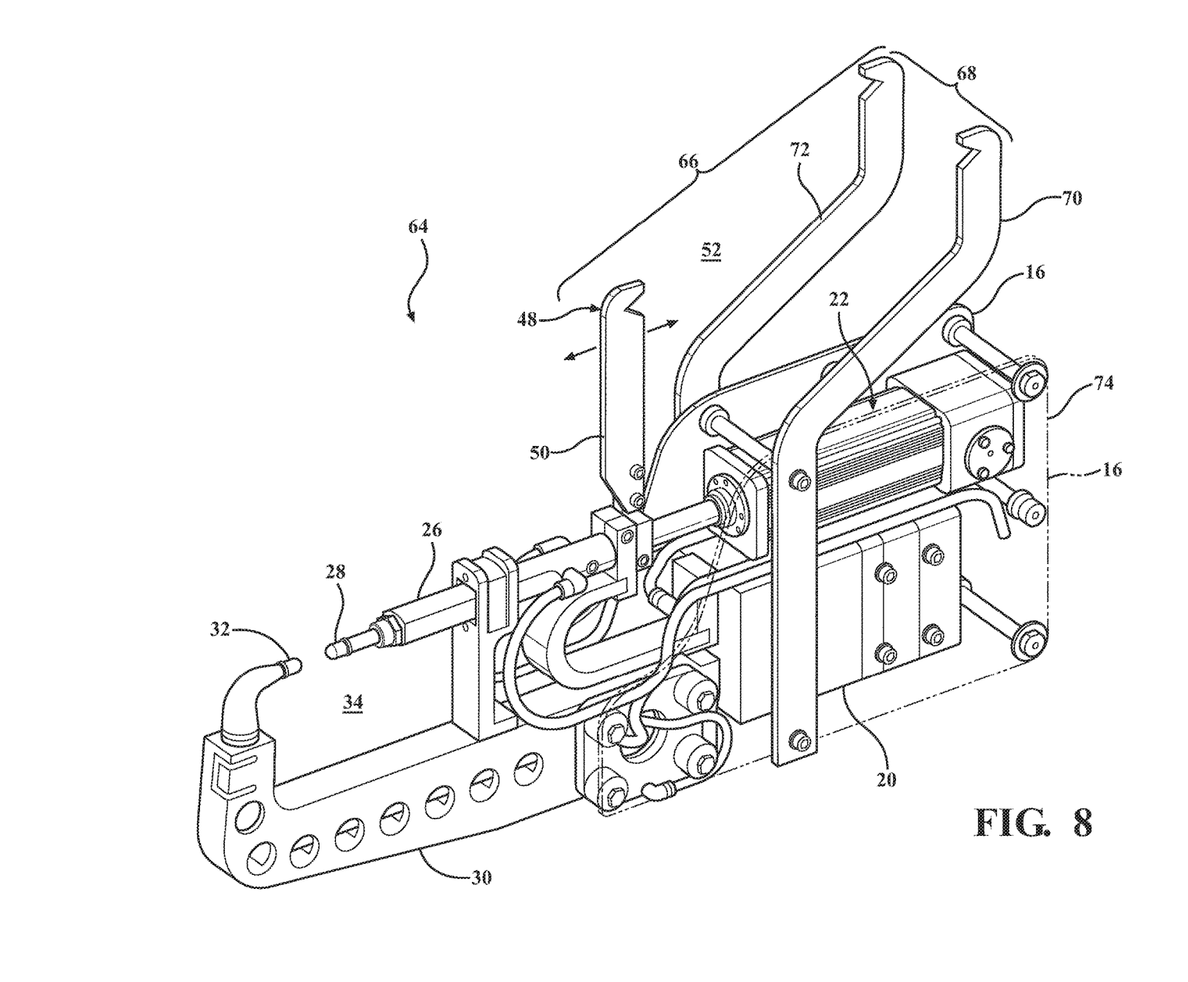
FIG. 8 is a schematic perspective view of the exemplary resistance spot welding gun part clamp of FIG. 7 illustrating the clamp jaws arranged in a closed position.

With reference to FIGS. 7 and 8, an alternately configured weld gun part clamp device 64 similar to weld gun part clamp device 10 is illustrated, but includes an alternately configured weld gun part clamp 66. Clamp 66 includes an alternately configured first jaw 68 having a first jaw member 70 and a second jaw member 72, each connected to respective side plates 16 across a width of weld gun 12, as generally illustrated. First jaw members 70 and 72 have their upper portions angled rearward toward a proximal end 74 of welding gun 12 to allow for a larger or wider part 14 (not shown) to be grasped and manipulated than the first jaw members 40 and 42 shown in FIGS. 1-4. First jaw member 70 and second jaw member 70 operate in a similar manner as first jaw member 40 and second jaw member 42 of weld gun part clamp 36, but are differently configured to accommodate a part configured differently from part 14. First and second jaw members 70 and 72 are elongate members rigidly connected to side plates 16 through common fasteners 44 or another connection mechanism, for example, welding and brazing. Jaw members 70 and 72 each include seat 46, illustrated in the form of a triangular notch, to engage a portion of a part. Jaw members 70 and 72 may be made from heavy gauge steel. Other materials may also be employed. Although two separate jaws members are illustrated, it shall be understood that jaw members may be made from a single piece and there may be fewer or more jaw members to constitute first jaw 68. First jaw 68 may be employed with one or more of the spot welding guns illustrated and described throughout the application. As can be seen, clamp 36 and the configuration of first jaw 38 and second jaw 48 (see FIGS. 1 and 2), and connections to a weld gun 12 or other end effectors, may be varied to suit particular material handling and build station operations and to accommodate particular parts and applications.

With continued reference to FIGS. 7 and 8, second jaw 48 may be positioned opposite first jaw 68. Second jaw 48 includes third jaw member 50 similar in configuration, positioned in opposing orientation and made from similar materials, as first and second jaw members 70 and 72. First jaw 68 and second jaw 48 form throat 52 between the jaws. Third jaw member 50 is connected to actuator piston rod 24 and reciprocates along with piston rod 24 and first weld tip 28 between a closed position to close a linear distance between first jaw 68 and second jaw 48 across throat 52, as illustrated in FIG. 8, and an open position to open the linear distance between first jaw 68 and second jaw 48 across throat 52, as illustrated in FIG. 7.

Figure 9:
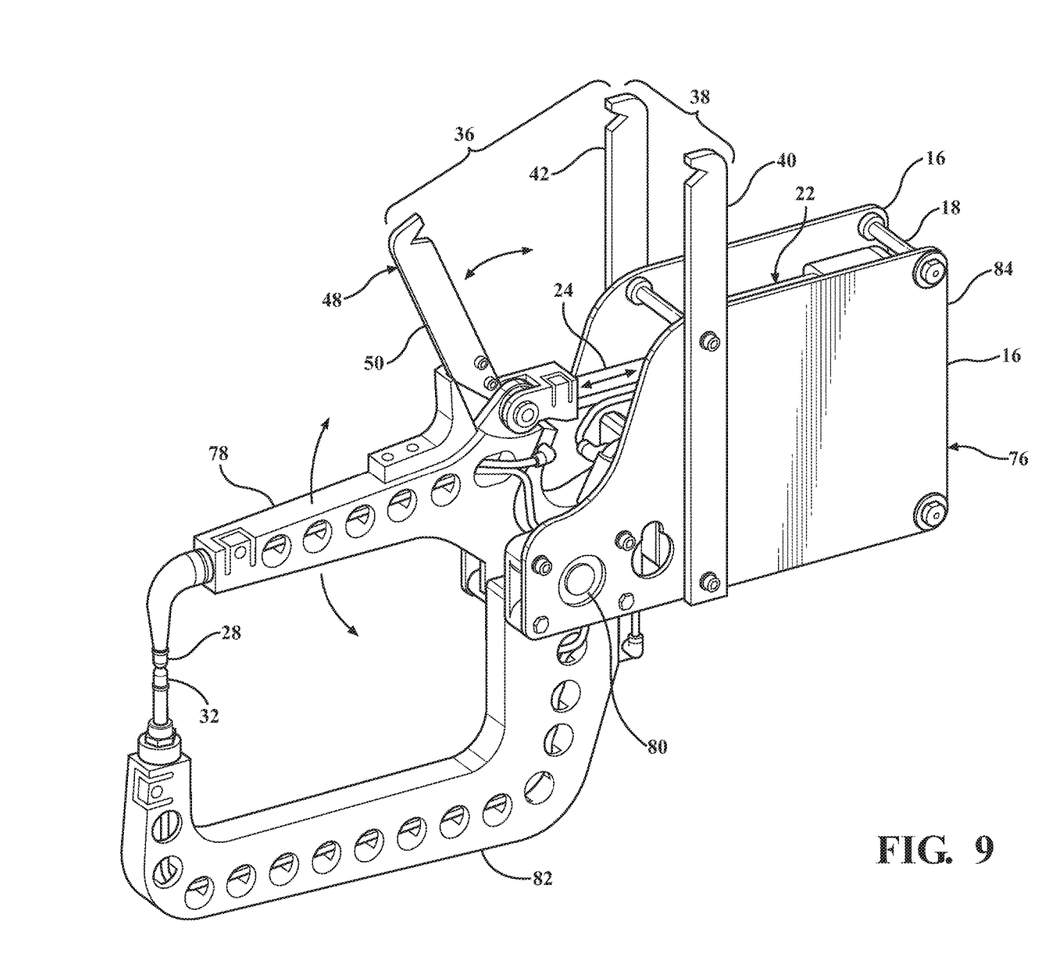
FIG. 9 is a schematic perspective view of an alternatively configured exemplary resistance spot welding gun part clamp with a weld jaw tips and part clamp arranged in an open position.
Figure 10:
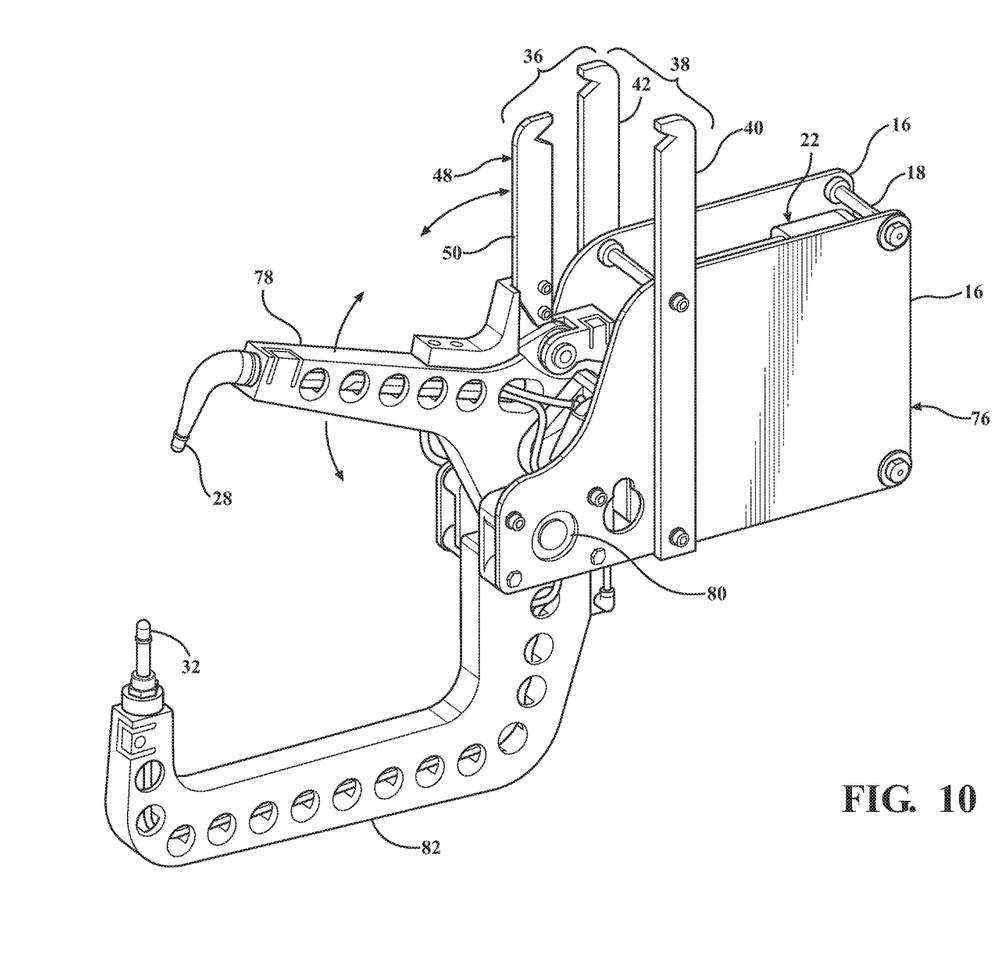
FIG. 10 is a schematic perspective view of the exemplary resistance spot welding gun part clamp of FIG. 9 with the weld jaw tips and part clamp arranged in a closed position.

Referring to FIGS. 9 and 10, weld gun part clamp 36 may be employed with an alternately configured welding gun alternate 76. Welding gun 76 employs similar components and is similarly configured as welding gun 12, and utilizes actuator 22 that includes the linearly moving piston rod 24 illustrated in the prior examples, but employs an alternately configured first moveable weld arm 78. First weld arm 78 pivots about a rotational bearing 80 and axis connected to side plates 16 toward an alternately configured fixed second weld arm 82, as generally illustrated in FIGS. 9 and 10. FIG. 9 shows actuator cylinder 22 extended to pivotally move second jaw 48 away from first jaw 38, thereby opening clamp 36. FIG. 10 illustrates actuator cylinder 22 retracted toward a distal end 84 of welding gun 76 to pivotally move second jaw 48 toward first jaw 38, thereby closing clamp 36.

Figure 11:
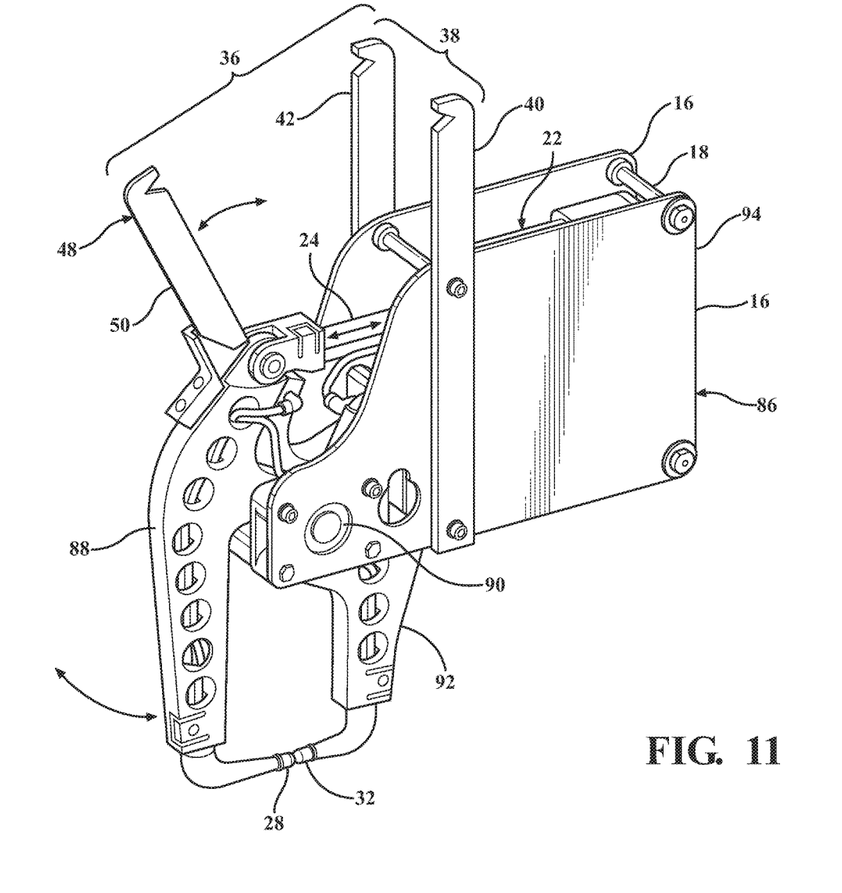
FIG. 11 is a schematic perspective view of an alternatively configured exemplary resistance spot welding gun part clamp with the weld jaw tips in a closed position and part clamp arranged in an open position.
Figure 12:
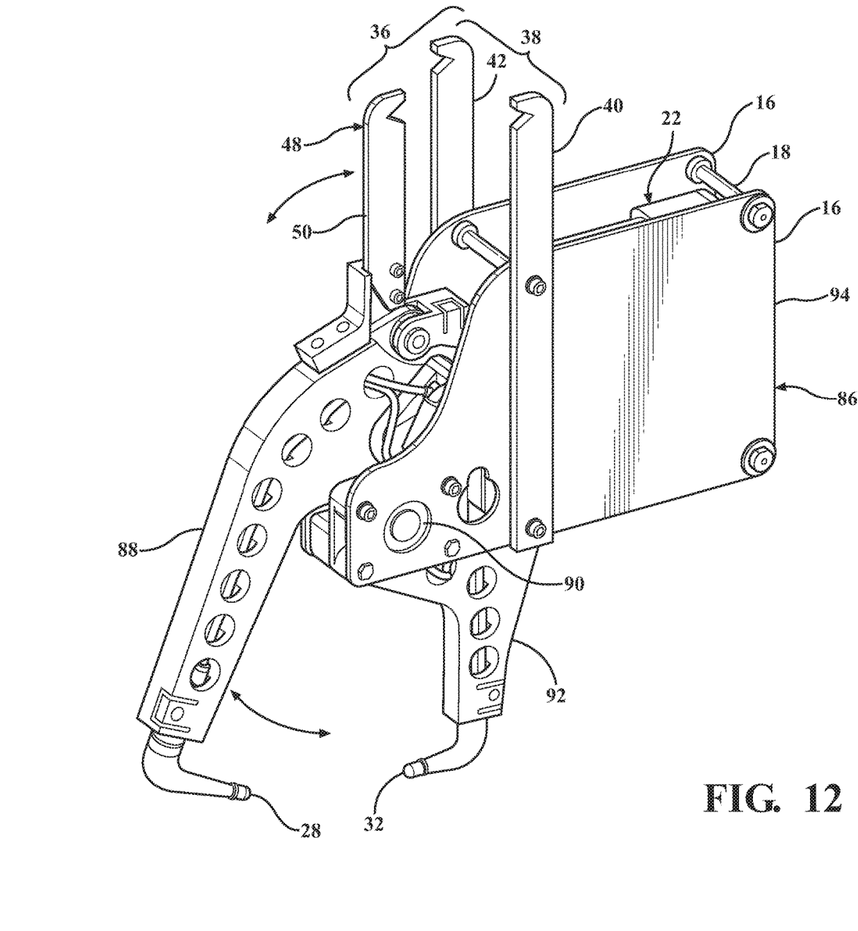
FIG. 12 is a schematic perspective view of the exemplary resistance spot welding gun part clamp of FIG. 11 with the weld jaw tips in an open position and part clamp arranged in a closed position.

Referring to FIGS. 11 and 12, weld gun part clamp 36 may be employed with an alternately configured welding gun alternate 86. Welding gun 86 employs similar components and is similarly configured as welding gun 12, and utilizes actuator 22 that includes the linearly moving piston rod 24 illustrated in the prior examples, but employs an alternately configured first moveable weld arm 88. First weld arm 88 pivots about a rotational bearing 90 and axis connected to side plates 16 toward an alternately configured fixed second weld arm 92, as generally illustrated in FIGS. 11 and 12. FIG. 11 shows actuator cylinder 22 extended to pivotally move second jaw 48 away from first jaw 38, thereby opening clamp 36. FIG. 12 illustrates actuator cylinder 22 retracted toward a distal end 94 of welding gun 86 to pivotally move second jaw 48 toward first jaw 38, thereby closing clamp 36.

Figure 13:
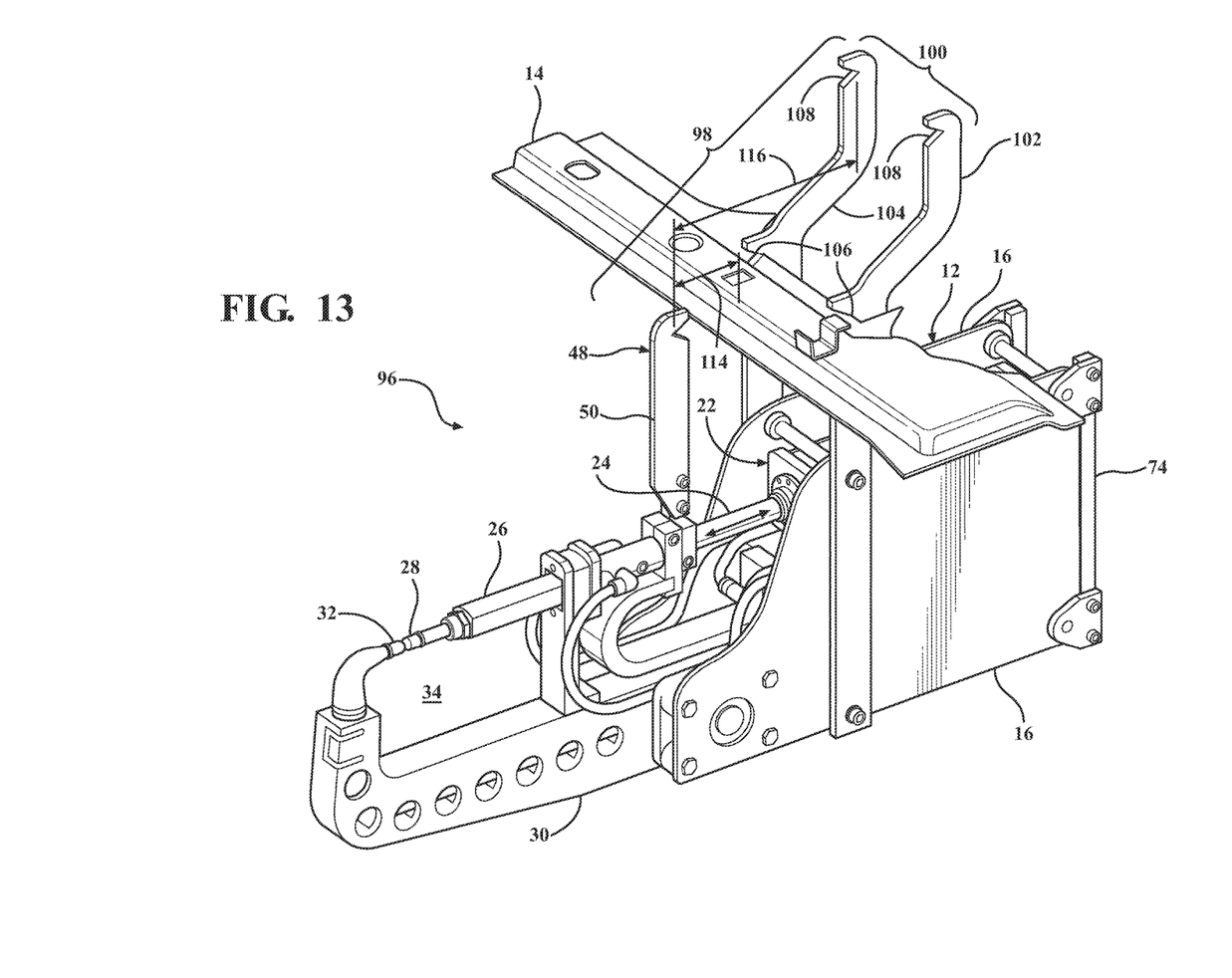
FIG. 13 is a schematic perspective view of the exemplary weld gun part clamp device of FIG. 1 employing an alternately configured clamp jaws arranged in an open position with a part positioned in the part clamp.

With reference to FIG. 13, an alternately configured weld gun part clamp device 96 may be configured for grasping differently configured parts using a single weld gun part clamp device 96. Weld gun part clamp device 96 may be similarly configured to weld gun part clamp device 10 (see FIGS. 1-4) and weld gun part clamp device 64 (see FIGS. 7 and 8), but includes an alternately configured weld gun part clamp 98 combining the features of weld gun part clamp 36 of weld gun part clamp device 10 (see FIGS. 1-4) and weld gun part clamp 66 of weld gun part clamp device 64 (see FIGS. 7 and 8). Weld gun part clamp 98 may be configured to grasp two or more differently configured parts without having to be modified.

Weld gun part clamp 98 includes an alternately configured first jaw 100 having a first jaw member 102 and a second jaw member 104. First and second jaw members 102 and 104 may be configured as elongate members rigidly connected to side plates 16 through common fasteners 44 or another connection mechanism, for example, welding and brazing. Jaw members 102 and 104 may be made from heavy gauge steel. Other materials may also be employed. Although two separate jaws members are illustrated, it shall be understood that the jaw members may be made from a single piece and there may be fewer or more jaw members to constitute first jaw 100. First jaw 100 may be employed with one or more of the spot welding guns illustrated and described throughout the application.

First jaw members 102 and 104 each include a first seat 106, illustrated in the form of a triangle notch, for engaging a portion of part 14 (see FIGS. 3 and 4). First seat 106 may be positioned along first jaw members 102 and 104 in a similar position as first seat 46 on first and second jaw members 40 and 42 of weld gun part clamp 36 (see FIGS. 1 and 2). An upper portion of each jaw member 102 and 104 may be angled rearward toward proximal end 74 of welding gun 12, similar to first jaw members 70 and 72 of weld gun part clamp 66 (see FIGS. 7 and 8) to allow a larger or wider part than part 14 to also be grasped and manipulated using the same weld gun part clamp 98. A second seat 108 for engaging the larger part may be similarly configured in the form of a triangle notch. Second seat 108 may be located near a distal end 110 of first jaw member 102 and a distal end 112 of second jaw member 104.

With continued reference to FIG. 13, second jaw 48 may be positioned opposite first jaw 100. Second jaw 48 includes third jaw member 50, similar in configuration, positioned in opposing orientation and made from similar materials, as first and second jaw members 102 and 104. First jaw 100 and second jaw 48 form a first throat 114 for receiving a part, for example part 14, and a second throat 116 for receiving a differently configured second part.

First jaw member 102 and second jaw member 104 may operate in a similar manner as first jaw members 40 and 70 and second jaw members 42 and 72 of weld gun part clamps 36 and 64, respectively. Third jaw member 50 is connected to actuator piston rod 24 and reciprocates along with piston rod 24 and first weld tip 28 between a closed position to close a linear distance between first jaw 100 and second jaw 48 across throats 114 and 116, and an open position to open the linear distance between first jaw 100 and second jaw 48 across throats 114 and 116. Weld gun part clamp 98 is illustrated in the open position in FIG. 13.

This present invention reduces the number and types of robots needed in a particular build station, reduces the number of components and equipment that need to be supported and maneuvered by the robot, reduces programming and coordination of additional robots and actuators, reduces equipment cycle types thereby increasing throughput of product, reduces congestion and logistics issues inside the build station and significantly reduces costs, and reduces number of components leading to less failures.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The foregoing description relates to what is presently considered to be the most practical embodiment. It is to be understood, however, that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for connecting two or more components through use of a programmable multi-axis robot having an end effector including a clamp first jaw and a second jaw, the method comprising:
    moving an actuator connected to one of the clamp first jaw or second jaw in a first direction to open the one of the clamp first jaw or second jaw defining a clamp throat;
    maneuvering the end effector to position a first component in the clamp throat;
    moving the actuator in a second direction to close the one of the first jaw or second jaw engaging the first component with the first and the second clamp jaws;
    maneuvering the end effector and engaged first component to position the first component into abutting engagement with a second component;
    moving the actuator in the first direction to open the one of the first jaw or second jaw and releasing engagement of the first component;
    maneuvering the end effector to position the end effector adjacent to the abutting first and second components; and
    fixedly connecting the first and the second components together through moving the actuator in the first direction.

2. The method of claim 1 wherein the end effector is a resistance spot welding gun having a first weld arm and a second weld arm having respective weld tips and defining a second throat between the arms and the actuator connected to one of the first or the second weld arms, the method comprising the steps of:
    moving the actuator in the second direction to open one of the first or the second weld arms providing access to the second throat; and
    the step of maneuvering the end effector to position the end effector adjacent the abutting first and second components further comprises the step of positioning a portion of the first and the second component in the second throat.

3. The method of claim 2 wherein prior to fixedly connecting the first and the second components, the step of moving the actuator in the first direction further comprises the step of engaging the first and the second arm weld tips with the first and the second components.

4. The method of claim 3 further comprising the step of applying electrical current through the first and the second weld arm weld tips to weld the first and the second components together.

5. The method of claim 2 wherein the one of the first and the second clamp jaws is connected to a pivot, wherein moving the actuator in the first direction angularly displaces the pivoted jaw about a pivot axis in a first angular direction.

6. The method of claim 5 wherein one of the first or the second weld arms is connected to the pivot wherein moving the actuator in the first direction angularly displaces the pivoted weld arm about the pivot axis in the first angular direction.

7. The method of claim 6 wherein one of the first or the second weld arms is connected to the pivot wherein moving the actuator in the second direction angularly displaces the pivoted weld arm about the pivot axis in a second angular direction.

8. A method for component handling and connecting of components through use of an end effector having a clamp and single actuator connectable to a multi-axis robot, the single actuator operating both the end effector and the clamp, the method comprising the steps of:

- positioning a first component in a clamp throat between first and second jaws of the clamp one of the first or the second jaws connected to the single actuator;
- selectively cycling the single actuator to engage the first component with the first and the second jaws to secure the first component to the end effector for material handling operations;
- cycling the single actuator to disengage the first and the second jaws from the first component whereby the first component is positioned in abutting contact with a second component; and
- fixedly connecting the first component to the second component through use of the end effector connected to the single actuator by cycling the same single actuator used to clamp the first component for the material handling operations.

* * * * *